United States Patent
Baumgartner et al.

(10) Patent No.: US 6,250,434 B1
(45) Date of Patent: Jun. 26, 2001

(54) WEAR ADJUSTING DEVICE FOR DISK BRAKES AND METHOD FOR CONTROLLING THE DEVICE

(75) Inventors: Hans Baumgartner, Moosburg; Dieter Bieker, Oberaudorf, both of (DE)

(73) Assignee: Knorr-Bremse Systeme fur Nutzfahrzeuge GmbH, Munich (DE)

(*) Notice: Subject to any disclaimer, the term of this patent is extended or adjusted under 35 U.S.C. 154(b) by 0 days.

(21) Appl. No.: 09/423,799
(22) PCT Filed: Jul. 15, 1998
(86) PCT No.: PCT/DE98/01982
  § 371 Date: Nov. 12, 1999
  § 102(e) Date: Nov. 12, 1999
(87) PCT Pub. No.: WO99/05428
  PCT Pub. Date: Feb. 4, 1999

(30) Foreign Application Priority Data

Jul. 23, 1997 (DE) .............................. 197 31 696

(51) Int. Cl.[7] .................................. F16D 65/52
(52) U.S. Cl. .................... 188/71.7; 188/71.8; 188/196 R
(58) Field of Search ................... 188/71.7, 71.8, 188/71.9, 196 R, 196 D

(56) References Cited

U.S. PATENT DOCUMENTS

| 4,592,451 | * | 6/1986 | Persson | 188/71.9 |
| 4,966,255 | * | 10/1990 | Fossum | 188/71.8 |
| 5,568,845 | | 10/1996 | Baumgartner et al. . | |
| 5,582,273 | | 12/1996 | Baumgartner et al. . | |
| 6,000,507 | * | 12/1999 | Bohm et al. | 188/158 |

FOREIGN PATENT DOCUMENTS

19536694 * 3/1997 (DE) .

* cited by examiner

Primary Examiner—Robert J. Oberleitner
Assistant Examiner—Melody M. Burch
(74) Attorney, Agent, or Firm—Barnes & Thornburg

(57) ABSTRACT

The invention relates to a wear adjusting device for a motor vehicle disk brake and a method for controlling the device. A brake actuated rotating lever primarily effects a slidable element which actuates at least one adjusting spindle. The spindle presses a brake lining in the direction of a brake disk. According to the invention, the adjustment device consists of an electric drive which adjusts at least one of the adjusting spindles through rotary operation.

9 Claims, 1 Drawing Sheet

WEAR ADJUSTING DEVICE FOR DISK BRAKES AND METHOD FOR CONTROLLING THE DEVICE

BACKGROUND AND SUMMARY OF THE INVENTION

The invention relates to a wear adjusting device for disk brakes as well as to a method for controlling a wear adjusting device.

A wear adjusting device for pneumatically operated desk brakes is known, for example, from International Patent Document WO 91/19115. The disk brake according to International Patent Document WO 91/19115 having an application device on one side contains a cam lever which is rotatable about an axis parallel to the brake disk plane and preferably interacts by way of a traverse with one or two adjusting spindle(s) against which a brake lining is supported. The two adjusting spindles are coupled by a belt or a chain. A rotary drive, which can be driven by the cam lever, projects into a recess of the one adjusting spindle and, during the contact stroke causes a screwed connection of the adjusting spindle—and thus, by way of the toothed belt, also of the second adjusting spindle—in the approaching direction with the brake disk. The rotary drive contains a one-way rotary clutch as well as a torque-limiting or overload clutch by means of which an unintentional screwed connection of the adjusting spindles is avoided during the stall stroke and the release stroke.

Important elements of the above-mentioned brake adjustment are the one-way clutch and the overload clutch which are designed, for example, as systems operating in a frictionally engaged manner. For example, the one-way clutch operates as a wrap spring one-way clutch and the overload clutch operates as a friction slipping clutch or as an axial denture clutch. International Patent Document WO 91/19115 illustrates, for example, in FIG. 5 that the overload clutch is constructed in the roller bearing technology as a ball coupling whose shifting moment is caused exclusively by the geometry of the ramp-shaped pockets receiving the balls and by the extent of the prestressing force. This system has the advantages of being virtually free of frictional influences and permitting very high shifting moments in a small space. The one-way clutch of this embodiment is implemented as a grip roller clamping one-way clutch which has a very high response precision and permits the implementation of very high transmission moments in a small space.

The above-described adjusting device has had good results per se but requires several high-precision parts and therefore represents an object of the efforts of searching for further possibilities for lowering the manufacturing costs of pneumatic disk brakes.

Another adjusting device as well as a method for operating a vehicle brake is disclosed in German Patent Document DE 195 21 401 C1 corresponding to U.S. Pat. No. 5,568,845. It is a disadvantage in this case that, for overcoming the easing play by the adjusting device, the operating time or reaction time of the brake is increased. The present invention relates to the described problems and provides an adjusting device which, in industrial-scale manufacturing, permits a clear reduction of cost in comparison to the above-described system. The characteristics of the solution are preferably a—particularly electronically commutated—direct-current geared motor or possibly a stepping motor is arranged in the brake-integrated control unit such that the transmission output element acts in the sense of a rotary operation onto the wear adjusting mechanism of the brake.

Although disk brakes operated by electric motors have been known for a long time, because of the numerous problems with respect to their implementation (cost, resistance to failure, etc.), they have not been success in practice. The invention uses a different approach in that it remains with the concept of a pneumatically applied disk brake and only the adjusting of the brake is carried out by an electric drive. Thus, the invention ideally combines the advantages of a pneumatically operated disk brake (safety, reliability) with the advantages of an electric drive (low cost). In addition, by means of an electric drive, the response time is reduced during the adjusting of the brake; the required easing play can be reduced to a very low value as a result of the adjustment between brake operations according to the invetion; and the air consumption (for example, the emergy consumption connected with generating the air) of the pneumatic system is reduced.

In the case of two-spindle brakes, the intervention preferably takes place upon the synchronization mechanism (such as a chain). In the case of single-spindle brakes, it takes place preferably directly upon the wear adjusting element (adjusting spindle).

Advantageous further developments of the invention are contained in the subclaims.

The invention also solves the problem of operating an electric-motor-driven adjusting device for a pneumatically operated brake in a manner which is as simple and reliable as possible. The characteristics for solving this problem are the following sequence of steps:

Step A: Immediately after complete reduction of the operating pressure in the brake cylinder preferably a pneum another adjusting movement of the adjusting spindles is carried out which is dimensioned such that a complete elimination of the easing play is achieved.

Step B: Then the adjusting mechanism (the adjusting spindles) are set back by the electric drive by a defined amount which corresponds to a given desired easing play.

This type of adjustment has the following advantages: Since, when the brake is operated, the easing play is conventionally overcome by the rotary lever, the eccentric traverse and the piston, the response time of the brake is shortened. The required brake cylinder stroke and thus also the consumption of pressure energy is reduced because of the low required easing play which is adjusted exclusively between two brake operations. Since, after each operation of the brake, the easing play is newly adjusted in a precise manner, a very uniform easing play is, in addition, obtained under all operating conditions. In the event of a servicing, considerable time is saved because of the fact that all brakes of the vehicle can automatically be moved into the servicing position for the exchange of the brake lining and the easing play adjustment after the termination of the servicing also takes place automatically.

After each operation of the brake, the wear adjusting mechanism is triggered in the sense of an application until the easing play approaches zero. Subsequently, the adjusting mechanism is set back by way of the motor operator by a given amount which corresponds to the desired easing play. Thus, after the reduction of the operating pressure of the brake cylinder, an operating pulse is given in the sense of an application which is so long that a complete elimination of the easing play is achieved. Immediately following this application pulse, the setting back will then take place to the required desired easing play.

As an alternative for reducing the operating frequency of the adjusting mechanism, the above-described sequence may in each case only take place after a given number of brake operations.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
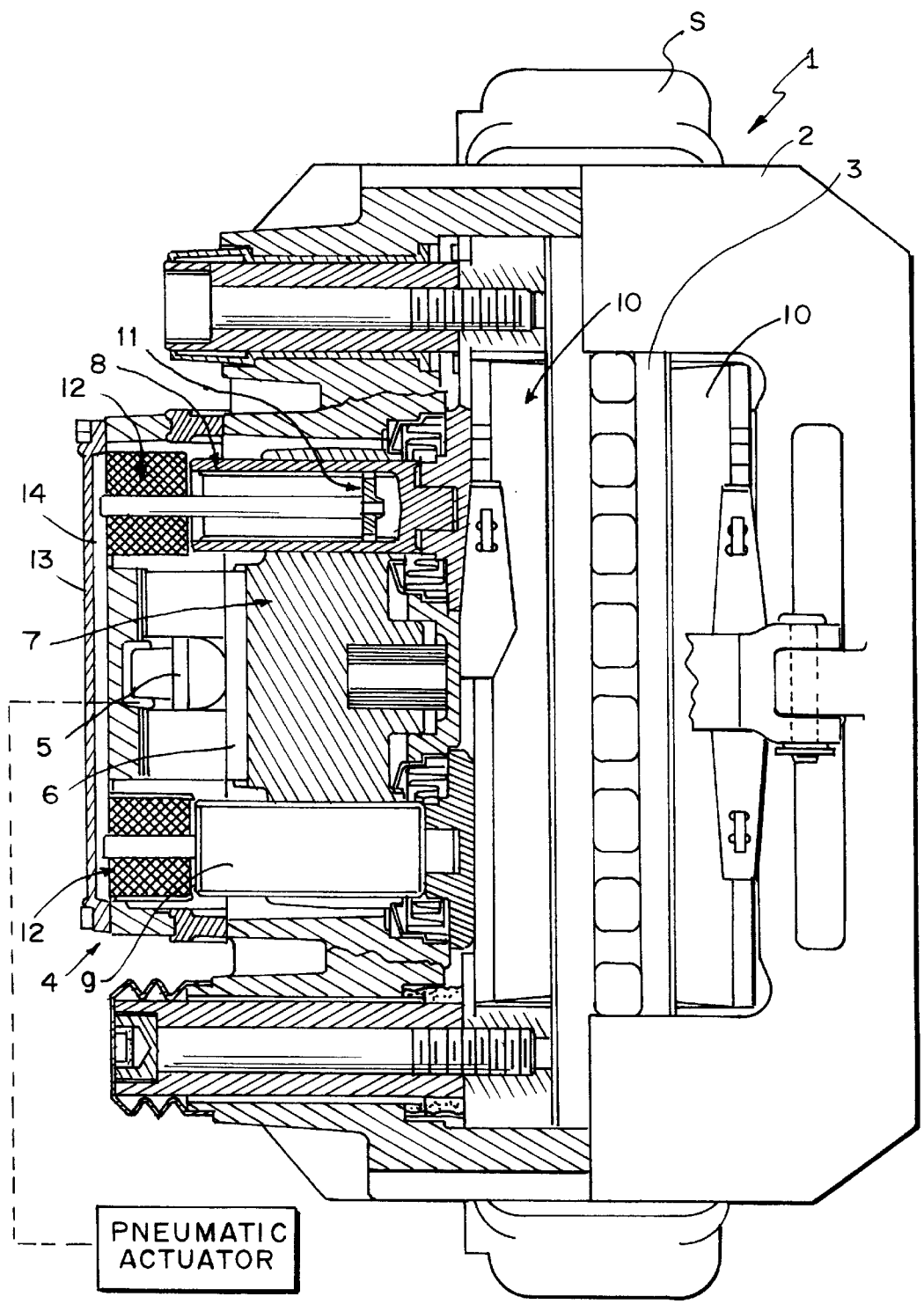
FIG. 1 is a partially sectional view of a disk brake with an embodiment of an adjusting device according to the invention.

The construction and function of the pneumatic disk brake according to FIG. 1 will be outlined first. The disk brake 1 has a caliper 2 which reaches around an internally ventilated brake disk 3. On one side of the brake disk 3, an application device 4 is provided which has a slidingly disposed operating rotary lever 5 which is moved by a piston rod of a compressed-air cylinder (not shown) and, in turn, operates or rotates an eccentric 6 which, in turn, by way of displaceable element, also known as a pressure piece traverse 7 interacts with two adjusting spindles 8, 9 against which one of the brake linings or shoes 10 is supported. The two adjusting spindles 8, 9 can be coupled and synchronized, for example, also by a chain (not shown). A spring is tensioned between the traverse element 7 and the caliper 2 and thus provides a pretensioning of the traverse element 7 in the direction of the rotary lever 5. The details are shown in the aforementioned U.S. Pat. No. 5,568,845.

On both exterior sides, the traverse element 7 has one bore respectively which is provided with an internal thread and into which bore the adjusting spindles 8 and 9 are screwed which are provided with external threads. Rotary drives 11, which are each driven directly by electric motors 12 and cannot be rotated relative to the spindles 8, 9, project into the recess of the adjusting spindles 8, 9.

When the brake is acted upon by compressed air, the rotary lever 5 is swiveled, which rotates the eccentric 6 and displaces the traverse element 7 in the direction of the brake disk 3, so that the spindles 8, 9 move in the direction of one lining 10. In the process, the caliper 2 axially displaceably disposed on a brake support S is also displaced and takes along the other brake lining 10 so that the brake is applied.

In the following, the function of the electric drive of the wear adjusting device according to the invention will now be described.

After each operation of the brake 1, after the reduction of the brake cylinder application pressure, one electric motor 12 is triggered in the sense of an application of the adjusting mechanism (step A). By way of the motor 12 and the rotary drive 11 and the synchronizing mechanism, the spindles 8, 9 are moved so far in the direction of the brake shoes 10 that, when the brake is released, the easing play approaches zero. After a complete pressure compensation has taken place at the operating piston of the brake, the electric motor 12 is then (according to a correspondingly dimensioned control formula) moved so far into the release direction that a defined easing play is achieved between the brake shoes 10 and the brake disk 3.

The above-described method is particularly advantageous, among other things, because it does not require additional sensor elements which would undesirably increase the costs of the adjusting device.

According to the variant of FIG. 1, each of the spindles 8, 9 has one of the electric motor operators 12 which, when an easing play path is exceeded, adjust the two adjusting spindles individually. In this case, by means of a corresponding analyzing logic in the electric brake system (for example, in the form of a supplementary software to the antilock system or the EBS control unit), the lining wear in general and a possibly occurring diagonal brake lining wear can be monitored and possibly corrected. Furthermore, it is advantageous to integrate the electric control an/or supply lines 14 into the closing lid 13, so that, when the lid is mounted, the required connections are also already installed.

What is claimed is:

1. A wear adjusting system for a pneumatically operated disk brake including a pneumatic actuator, the wear adjusting system comprising:

a) a rotary lever operating upon at least one displaceable element which operates at least two adjusting spindles, which press a brake lining in the direction of a brake disk during braking by the pneumatic actuator;

b) an adjusting device, coupled to the adjusting spindles and adjusts the adjusting spindles by a continued rotation;

c) a synchronization mechanism synchronizing the adjusting movements of the adjusting spindles; and d) the adjusting device has an electric drive coupled to the synchronization mechanism to rotatingly adjust the two adjusting spindles.

2. A wear adjusting system for a pneumatically operated disk brake comprising:

a) a rotary lever operating upon at least one displaceable element which operates an adjusting spindle which presses a brake lining in the direction of a pneumatic brake disk during braking;

b) an adjusting device coupled to the adjusting spindles and adjusts the adjusting spindles by a continued rotation; and c) the adjusting device has an electric drive coupled directly to the adjusting spindles to rotatingly adjust the adjusting spindle.

3. A wear adjusting device according to claim 1, wherein the electric drive is a commutated direct-current geared motor.

4. A wear adjusting device according to claim 1, wherein one or more electric control and supply lines are integrated in a closing lid of the disk brake.

5. A method for controlling a lining wear adjusting device a pneumatic disk brake having a pneumatic cylinder for applying and releasing the brakes and an electric drive for adjusting spindles, the method comprising:

completely reducing operating pressure in the brake cylinder;

adjusting movement of at least one of the adjusting spindles such that a complete elimination of easing play is achieved; and setting back the adjusting spindle by the electric drive by a given amount which corresponds to a defined desired easing play.

6. A method according to claim 5, further comprising the steps of coupling a rotary lever to the brake cylinder; and positioning the rotary lever to operate upon at least one displaceable element which operates at least one adjusting spindle, which press a brake lining toward a brake disk during braking; and actuating the electric drive to rotatingly adjust the at least one adjusting spindle.

7. A method according to claim 5, further comprising the step of adjusting the adjusting spindle when a given number of brake operations has been reached.

8. A method according to claim 5, wherein lining wear is monitored and corrected.

9. A method according to claim 5, wherein the brake includes two adjusting spindles; and diagonal wear is monitored and corrected using the adjusting spindles.

\* \* \* \* \*